2,863,795

POLYMERIZABLE MIXTURE OF VINYLIDENE MONOMER AND UNSATURATED POLYESTER CONTAINING A POLYHYDRIC ADDUCT OF HEXAHALOCYCLOPENTADIENE AND LAMINATE CONTAINING SAME

Paul Robitschek, Wilson, and Claude Thomas Bean, Niagara Falls, N. Y., assignors to Hooker Chemical Corporation, Niagara Falls, N. Y., a corporation of New York No Drawing. Application January 24, 1957
Serial No. 635,950

20 Claims. (Cl. 154—43)

This invention relates to new resinous compositions, and to methods for their manufacture, comprising a copolymerizable mixture of an unsaturated polyester (also referred to in the art as an unsaturated alkyd, or, unsaturated linear polyester or unsaturated polyester chain resin) and an unsaturated cross-linking agent, said mixture including a chemically combined component which imparts flame retardance to the polymerized mixture and which is an adduct of hexahalocyclopentadiene with a dienophile as hereinafter defined. This invention also relates to the polymerized flame retardant compositions in their finally reacted form, that is, as resinous, insoluble, infusible, copolymers, and to methods for their preparation.

This application is a continuation-in-part of our copending application Serial No. 308,921, filed September 10, 1952, now United States Patent 2,779,701.

The production of infusible, insoluble polyester resins which are flame retardant and have high resistance to heat is of considerable commercial importance. For instance, castings, moldings, foamed articles or laminated structures bonded by polyester type resins are for many uses required, or at least desired, to be resistant to fire and are also required to endure heat without deterioration. A typical illustration of an application having such a requirement is had in castings for live electrical contacts which must not be ignited by sparks or be deteriorated by heat generated therein. Other articles, such as pipes, wall coverings, panels, ash trays, etc., are further illustrations where flame retardance is desirable.

Heretofore certain chemical adducts have been disclosed as being useful in the preparation of ester resins, for example, it is known that the maleic acid-cyclopentadiene Diels-Alder adduct resulting from the diene synthesis and its reaction products with alpha, beta-unsaturated dicarboxylic acids or anhydrides and glycols form resinous compositions which may be made insoluble and infusible by further reaction with copolymerizable olefins to form a cross-linked copolymer. Such compositions are chemically different from the products of this invention because the double bond remaining in the linear unsaturated polyester so produced is highly reactive and can enter directly into the cross-linking reaction, whereas, the corresponding linkage in the halogen-containing derivatives employed in making the compositions of this invention is non-reactive in said copolymerization reaction; moreover, they do not possess flame retardance. Attempts have been made to impart flame retardance to such hydrocarbon type resinous polyester compositions by incorporating therein inert fireproofing agents, such as antimony oxide or chlorinated paraffin wax, as fillers which do not enter into chemical reaction with the components of the resin; however, this results in a loss in the desirable properties, particularly with respect to heat resistance, which are usually associated with polyester resins. Also the property enabling the production of satisfactory articles of commerce may be seriously impaired. Other attempts to impart flame retardance are also known which involve chemically combining tetrachlorophthalic acid or anhydride into the polyester resin. Compositions so produced are chemically unrelated to the products of this invention; they have only poor flame retardant properties and they usually possess low stability and low strength at elevated temperatures; therefore, they are not entirely satisfactory for many applications. Still other attempts involving the use of certain unsaturated organic phosphorus compounds as cross-linking agents which impart flame retardance to the final polyester resin have likewise been found unsatisfactory.

It is an object of this invention to provide resinous compositions which are highly resistant to burning and yet possess many of the desirable characteristics usually associated with polyester resins. A further object is to provide resinous compositions which are highly resistant to exposure at elevated temperatures. A still further object is to prepare resinous compositions which are suitable for casting, molding, foaming, or laminating and which are characterized by possessing the desirable properties usually required in resins in the preparation of castings, moldings, foamed articles and laminates, and which are also characterized by being capable of forming articles of commerce which have a pleasing appearance and wide utility.

A particular object of this invention is to make available in commerce compositions comprising a mixture of an unsaturated polyester, said unsaturated polyester being a composition comprising an adduct of hexahalocyclopentadiene and a polyhydric alcohol containing aliphatic carbon to carbon unsaturation, wherein the halogen is selected from the group consisting of chlorine, bromine, fluorine and mixtures thereof, a polycarboxylic compound and a polyhydric alcohol containing aliphatic carbon to carbon unsaturation and an olefinic cross-linking agent, with or without the presence of a catalyst and/or inhibitors and/or chain terminating agents and/or promoters or accelerators, which are capable of copolymerization to an insoluble, infusible, fire resistant polyester resin or said polyester compositions without the olefinic cross-linking agent.

A further objective is to provide methods for chemically combining hexahalocyclopentadiene in the form of an adduct into the polyesters. A still further objective is to provide methods for the preparation of these unsaturated polyesters and their combination with olefinic cross-linking agents. These objects, and still others which will become apparent to those skilled in the art on consideration of our specification and claims, are accomplished by the present invention.

In accordance with this invention the unsaturated polyester contains the component which imparts flame retardance in the polyhydric alcohol unit of the polyester. The unsaturated polyester must contain unsaturation which is capable of copolymerization with the unsaturation in the cross-linking agent. Such copolymerizable unsaturation is an essential characteristic of the unsaturated polyester portion of the mixture of this invention. We have found that the double bond, remaining in a polyester chain, which is derived from the reaction adducts of hexahalocyclopentadiene with mono-olefinic polyhydric alcohols is not sufficiently reactive to enter into the cross-linking reaction. We render such polyesters copolymerizable in the cross-linking reaction by incorporating in the esterification product a reactive and unsaturated chemical ingredient which retains its active unsaturation after being chemically combined in the polyester chain. Alternatively, or in addition to including flame retardant components in the unsaturated polyester, as just described, and in accordance with this invention, the cross-linking agent may contain the component which imparts flame retardance to the polyester resins of this invention.

The reactant components which impart flame retardance to the final polymerized resinous compositions by their incorporation in either the linear polyester or the unsaturated cross-linking agent may be prepared by effecting the chemical addition of a hexahalocyclopentadiene with an unsaturated polyhydric alcohol, presumably in accordance with the following equation, in which the specific rectants are given for purposes of illustration only:

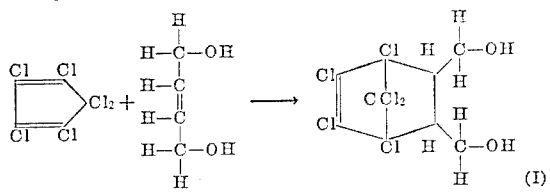

(I)

This, and similar Diels-Alder type reaction adducts of hexahalocyclopentadienes which are more fully disclosed hereinafter, can be esterified with a mixture of a polyhydric alcohol and a polycarboxylic acid, said polyhydric alcohols and polycarboxylic acids being more fully described hereinafter, to produce a soluble polyester chain containing the olefinic linkage originally present in the Diels-Alder adduct. The preparation of said adduct used in said polymerizable mixture is such that a polymerized cross-linked resin having a chlorine content between preferably 10 to 45 percent by weight is obtained. Particularly suitable materials for reacting with hexahalocyclopentadiene to form these adducts are unsaturated polyhydric alcohols such as alpha allyl glycerol ether or 2-butene-1,4-diol, capable of esterification without losing their ability of copolymerizing with olefinic cross-linking agents.

Along with introducing the aforedescribed adduct into the esterification reaction we additionally introduce a polyhydric alcohol containing aliphatic carbon to carbon unsaturation, such as alpha allyl glycerol ether or 2-butene-1,4-diol and a polycarboxylic compound which may be of a saturated aliphatic type, an aromatic type, or an aliphatic type containing aliphatic carbon to carbon unsaturation. If of the aliphatic type containing carbon to carbon unsaturation, this lends even more to the copolymerizable nature of the polyester, any of the foregoing described polycarboxylic compounds (and as hereinafter further described) and mixtures thereof, may be used to form the polyester compositions of this invention.

Alternatively, or in addition to providing unsaturation in the above manner, we may also provide for it by employing a Diels-Alder reactant with hexahalocyclopentadiene which has more htan mono-olefinic unsaturation, for example, a di-olefin or an acetylenic compound, and which retains, after being esterified in the polyester chain, an unsaturated linkage reactive in the cross-linking reaction.

The resinous copolymers of this invention may be prepared by first effecting the esterification of the selected hexahalocyclopentadiene polyhydric alcohol adduct with the polycarboxylic compound and the desired reactive unsaturated polyhydric alcohol whereby an unsaturated polyester is formed; then mixing the resulting composition with the chosen copolymerizable olefinic cross-linking agent; and, thereafter copolymerizing the mixture to form an insoluble, infusible polyester resin.

Among the adducts which are used in forming the compositions of this invention are the adduct of hexahalocyclopentadiene and alpha allyl glycerol ether and the adduct of hexahalocyclopentadiene and 2-butene-1,4-diol.

Among the polyhydric alcohols containing aliphatic carbon to carbon unsaturation which are used in forming the compositions of this invention are alpha allyl glycerol ether and 2-butene-1,4-diol.

Among the saturated aliphatic types of polycarboxylic compounds which may be used in forming compositions of this invention are sebacic acid, adipic acid, azelaic acid, dimer acid, diglycolic acid, isosebacic acid, oxalic acid, malonic acid, succinic acid, glutaric acid, pamelic acid, suberic acid, succinic anhydride, malonic anhydride, and mixtures thereof.

Among the aromatic types of polycarboxylic compounds which as desired, may or may not be so used are phthalic acid, phthalic anhydride, isophthalic acid, and terephthalic acid and mixtures thereof.

Both of the foregoing types of polycarboxylic compounds are characterized by their freedom from cross-linkable, copolymerizable unsaturation.

Among the aliphatic types of polycarboxylic compounds containing aliphatic carbon to carbon unsaturation which, as desired, may or may not be so used are maleic acid and maleic anhydride, fumaric acid, aconitic acid, citraconic acid, mesaconic acid, pyrocinchoninic acid, ethyl maleic acid, itaconic acid, xeronic acid, carbic acid and mixtures thereof. This group of polycarboxylic compounds possesses cross-linkable, copolymerizable unsaturation.

Among the polymerizable compounds containing aliphatic carbon to carbon unsaturation which may be used as the cross-linking agent for the foregoing described polyester resinous materials, in order to form final co-polymerized thermoset resins, are vinyl acetate and acrylonitrile.

The esterification of the desired ingredients may be effected in the presence of esterification catalysts and/or chain terminating agents. A preferred procedure involves introducing the selected ingredients to be esterified, in predetermined proportions, into a suitable esterification vessel provided with heating and/or cooling means, an agitator, means for maintaining an atmosphere of an inert gas such as nitrogen or carbon dioxide over the reaction mixture, means for removing water of esterification, an inlet, an outlet, and any other accessories necessary for the reaction. The charged reactants are blanketed with an inert atmosphere, then agitated and heated to effect the reaction for the specified period of time. After the desired degree of reaction has been attained, as conveniently determined by employing the acid number technique or measuring the amount of water liberated, the reaction mixture is cooled. The resulting product, if solid, is broken up and then mixed with the olefinic cross-linking agent, preferably in the presence of a polymerization inhibitor.

We have found that the cross-linking agent may be advantageously combined with unsaturated polyesters prepared in accordance with these methods while the unsaturated polyester is an an elevated temperature and that the olefinic cross-linking agent may also be at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing or effecting the copolymerization reaction into the insoluble, infusible, polyester resin. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

In order that this invention may be more readily understood and to further illustrate the details thereof, the following examples are given which show preferred compositions of this invention and methods for their preparation.

Example 1

Twenty and two-tenths parts of the adduct of hexahalocyclopentadiene and alpha allyl glycerol ether, 4.4 parts of 2-butene-1,4-diol, and 14.6 parts of adipic acid were charged into an esterification vessel provided with heating and/or cooling means, an agitator, means for maintaining an atmosphere of an inert gas over the reaction mixture, means for removing water of esterification, temperature recording means, charging inlets and outlets, etc. The charge was blanketed with an inert atmosphere of nitrogen, agitated, then heated to a temperature between about 80 to 100 degrees centigrade and reacted to an acid number of approximately 50. Upon reaching this point, the entire contents of the reaction vessel were cooled and cast into pans under an inert atmosphere. A transparent, faintly colored, hard, brittle, soluble material having 26.9 percent by weight of chlorine content was obtained. One hundred parts of this resinous product were dissolved in 40 parts of acryonitrile and catalyzed with 1.4 parts of Luperco ATC which is a 50–50 mixture of benzoyl peroxide and tricresyl phosphate. This catalyzed mixture was cured at 50 degrees centigrade for 48 hours and then post cured at 80 degrees centigrade for 24 hours. The resulting product was a hard, tough, fire-resistant, clear, thermoset product, having a chlorine content of 19.3 percent.

Example 2

Twenty and two tenths parts of the adduct of hexahalocyclopentadiene and alpha allyl glycerol ether, 4.4 parts of 2-butene-1,4-diol, and 14.8 parts of phthalic anhydride were charged into an esterification vessel provided with heating and/or cooling means, an agitator, means for maintaining an atmosphere of an inert gas over the reaction mixture, means for removing water of esterification, temperature recording means, charging inlets and outlets, etc. The charge was blanketed with an inert atmosphere of nitrogen, agitated, then heated to a temperature between about 80 to 100 degrees centigrade and reacted to an acid number of approximately 50. Upon reaching this point, the entire contents of the reaction vessel were cooled and cast into pans under an inert atmosphere. A transparent, faintly colored, hard, brittle, soluble material having 26.9 percent by weight of chlorine content was obtained. One hundred parts of this resinous product were dissolved in 40 parts of acrylonitrile and catalyzed with 1.4 parts of Luperco ATC which is a 50–50 mixture of benzoyl peroxide and tricresyl phosphate. This catalyzed mixture was cured at 50 degrees centigrade for 48 hours and then post cured at 80 degrees centigrade for 24 hours. The resulting product was a hard, tough, fire-resistant, clear, thermoset resinous product having a chlorine content of 19.3 percent.

Example 3

Twenty and two-tenths parts of the adduct of hexahalocyclopentadiene and alpha allyl glycerol ether, 14.8 parts of phthalic anhydride and 6.6 parts alpha allyl glycerol ether, were charged into an esterification vessel of the type used in Example 1. The reaction was carried out in the same manner as that of Example 1. The resinous product formed contained 25.5 percent of chlorine and after 100 parts of this resinous product were cross-linked and copolymerized with 40 parts of acrylonitrile, the final copolymerized resin contained 18.2 percent chlorine and was a hard, tough, fire-resistant, clear, thermoset, resinous product.

Example 4

Seventeen and nine-tenths grams of the adduct of hexahalocyclopentadiene and 2-butene-1,4-diol, 14.6 parts of adipic acid, and 4.4 parts of 2-butene-1,4-diol were charged into an esterification vessel as described in Example 1, and esterified until an acid number of 50 was reached. The polyester resinous product thus formed contained 28.7 percent chlorine. One hundred parts of this resinous material were cross-linked with 40 parts of acrylonitrile and copolymerized giving a hard, tough, fire-resistant, clear, thermoset resinous product having a chlorine content of 20.5 percent.

Example 5

Twenty and two-tenths parts of the adduct of hexahalocyclopentadiene and alpha allyl glycerol ether, 7.3 parts of adipic acid, 5.8 parts of fumaric acid, and 4.4 parts of 2-butene-1,4-diol were charged into a reaction vessel of the type of Example 1 and esterification was carried out until an acid number of 50 was reached. The polyester resinous material thus formed had a chlorine content of 28.9 percent. One hundred parts of this material were copolymerized with 40 parts of acrylonitrile and a hard, tough, clear, thermoset, fire-resistant, resinous product was obtained, having a chlorine content of 20.6 percent.

Example 6

Twenty and two-tenths parts of the adduct of hexahalocyclopentadiene and alpha allyl glycerol ether, 11.6 parts of fumaric acid and 4.4 parts of 2-butene-1,4-diol were placed in a reaction vessel similar to that of Example 1 and were reacted at an elevated temperature to an acid number of 50, forming a soluble, polyester resinous product having a chlorine content of 29.3 percent. One hundred parts of this resin were then reacted with 40 parts of acrylonitrile, producing a resultant thermoset resinous product which was hard, tough, fire-resistant and clear, and which had a chlorine content of 20.9 percent.

The processing techniques for producing the necessary ingredients to be used in making the compositions of this invention are subject to various modifications and the proportions of ingredients may also be varied without departing from our invention.

The temperature for carrying out the esterification reaction ranges from about 80 degrees centigrate to 100 degrees centigrade, although higher or lower temperatures can be used.

An inert gas such as nitrogen is passed through the mixture in a preferred procedure to accelerate the progress of the reaction and allow for good color of the product. The progress of the reaction is followed by measuring the rate of water liberated, by the viscosity of the resin, by its acid number, or by other methods commonly known in the art. The extent to which the reaction is carried out will depend on a number of factors, such as the desired viscosity, melting point, duration of reaction, etc.

Esterification catalysts such as para-toluene sulfonic acid, benzene sulfonic acid, beta naphthalene sulfonic acid, etc., or amines such as pyridine, triethyl amine, quinoline, etc., may be added to the reaction mixture.

A chain stopper may be added in a minor proportion depending on the molecular weight of the linear unsaturated polyester chain desired, in order to rapidly terminate the growth of the unsaturated polyester chain during the esterification reaction and when the desired acid number is being approached, or, to reduce the number of free carboxyl or hydroxyl groups, or, to introduce a hydrocarbon terminal residue. Among the compounds which may be used as chain stoppers during the esterification reaction whereby the unsaturated polyester chain is produced are a wide variety of monohydric alcohols, such as butyl, hexyl, actyl, dodecyl, benzyl, and tetrahydrofurfuryl alcohols, or, monobasic acids such as, acetic, propionic, butyric, ethyl hexoic, and benzoic.

The solution or mixture of unsaturated polyester and olefinic cross-linking agent is preferably made while the unsaturated polyester is still hot, thereby facilitating rapid solution. Alternatively, the unsaturated polyester may be cooled and stored and when ready for mixing may be heated in order to facilitate solution in the olefinic cross-linking agent, which may also be heated. The solution may, of course, be made in the cold, especially if there is any possibility of explosion in handling the hot olefinic cross-linking agent or if polymerization of the olefinic cross-linking agent cannot be prevented when at elevated temperatures even by the presence of inhibitors therefor.

The proportion of olefinic cross-linking agent to unsaturated polyester may be varied within the ultimate limits of each without departing from the scope of this invention, in order to make the solution or mixture of this invention which may be set to the infusible, insoluble, polyester resin. For example, only a small proportion of olefinic cross-linking agent is needed when the proportion of reactive cross-linkable olefinic bonds in the unsaturated polyester is very small; and a still smaller proportion of olefinic cross-linking agent may be employed if it is desired to react only a part of the total of said unsaturated bonds in such polyester in the cross-linking reaction. On the other hand, a major proportion of olefinic cross-linking agent to unsaturated polyester may be employed when the proportion of reactive cross-linkable olefinic bonds in the unsaturated polyester is high; and a still higher proportion of olefinic cross-linking agent will be required if it is desired to react a major part of the total of said unsaturated bonds in such polyester in the cross-linking reaction. In general, the concentration of the unsaturated polyester in the olefinic cross-linking agent and unsaturated polyester mixture may vary between about 10 and 90 percent. In certain formulations and in order to accentuate a large number of desirable properties in the polyester resin produced, we find it preferable to employ between about 15 and 45 percent of the olefinic cross-linking agent by weight of the total resin and cross-linking agent, e. g. acrylonitrile, when the unsaturated polyester is similar to that produced in Example 1. However, it is to be understood that this preferred concentration is a variable which is dictated by the particular properties of the materials employed and the particular properties desired in the polyester resin produced.

Polymerization inhibitors, usually of the order of 0.001 to 1 percent of the composition may be added to prevent premature polymerization. Among the inhibitors which may advantageously be employed to prevent the premature polymerization of the mixture of unsaturated polyester and olefinic cross-linking agents, particularly if the mixture is to be stored or shipped in commerce prior to curing, are substances such as hydroquinone, benzoquinone, para-tertiary butyl catechol, para-phenylene diamine, trinitrobenzene, and picric acid.

Polymerization catalysts are preferably added to the mixture of unsaturated polyester and olefinic cross-linking agent to effect setting or curing. Catalysts such as benzoyl peroxide, acetyl peroxide, lauroyl peroxide, methyl ethyl ketone peroxide, and cumene hydroperoxide, have been found satisfactory. Such catalysts are used in a proportion of 0.01 to 10 percent depending on the efficiency of their action and whether or not substances which inhibit polymerization are present in the mixture to be cross-linked. The polymerization reaction may also be hastened by effecting it in the presence of promoters such as metals or metal salts, such as cobalt resinate, cobalt maleate, and cobalt naphthenate, or, by amines such as dibutyl amines, or mercaptans such as dodecyl mercaptan. These are used in proportions similar or smaller to that stated for catalysts.

The polymerization conditions for effecting the cross-linking reaction between the unsaturated polyesters of this invention and the olefinic cross-linking agent may be selected from the wide variety of techniques but usually involve the application of heat or light. Although pressure is not a required condition for effecting polymerization of the polymerizable mixtures embraced within the invention, thereby providing for a decided advantage over other resin mixtures known heretofore, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crazed, cracked, etc.

Various hexahalocyclopentadienes may be employed in making adducts for the compositions embraced within the scope of this invention. As used herein and in the appended claims the term "halo" includes the chloro, bromo, and fluoro substituted cyclopentadienes wherein all of the hydrogens are replaced by one or more of the foregoing halogens. While hexachlorocyclopentadiene is today the most readily available commercial hexahalocyclopentadiene, we have found that the mixed perhalo compounds are useful in making Diels-Alder adducts which can be chemically combined into the saturated polyester components of this invention.

In fact, hexachlorocyclopentadiene in which one or two of the chlorine atoms has been replaced with bromine, appears to afford an even higher degree of flame retardance in the polyester resins. The polyester resins made from a hexahalocyclopentadiene in which some of the chlorine of hexachlorocyclopentadiene has been replaced with fluorine atoms, are exceedingly interesting materials possessing enhanced heat resistance and aging properties. The foregoing applies whether the hexahalocyclopentadiene is utilized as a raw material in the making of the copolymerizable linear polyester or the unsaturated cross-linking agent.

The compounds useful in making adducts of hexohalocyclopentadienes are dienophiles having a plurality of esterifiable groups said dienophiles being defined as activated olefinic (or acetylenic) compounds which will form a Diels-Alder addition adduct with a conjugated diene system. These functional groups capable of esterification and having utility herein are found in compounds such as the polyhydric alcohols as hereinbefore illustrated.

The hexahalocyclopentadiene radical may be combined into the polyhydric alcohol unit of the unsaturated polyester chain in a variety of ways such as, by effecting the Diels-Alder reaction of the hexahalocyclopentadiene with unsaturated polyhydric alcohols such as, butene diol or pentene diol. Other suitable compounds are ethers or esters derived from polyhydric alcohols having at least three hydroxyl groups, one of which is esterified or etherified with an unsaturated alcohol or acid reactive with hexahalocyclopentadiene in the diene synthesis. For instance, allyl or vinyl glycerol ethers, allyl or vinyl pentaerythritol ether; and unsaturated acid esters of glycerol or pentaerythritol, such as acrylic or methacrylic esters thereof may be used. Instead of employing a polyhydric alcohol in the Diels-Alder reaction, adducts of hexahalocyclopentadiene with substances which produce an equivalent unsaturated polyester chain, upon reaction with a polycarboxylic acid can be used; for instance, esters of the alcohols may also be used.

The unsaturated polyester chains produced by effecting the Diels-Alder reaction of hexahalocyclopentadiene with a polyhydric alcohol, followed by the esterification of the product so produced with a polyfunctional acid and another polyhydric alcohol can be rendered copolymerizable by chemically combining in such polyester chains, a reactive and unsaturated chemical ingredient which retains its active unsaturation after its chemical combination into the polyester chain. Among the materials which may gainfully be employed for this purpose are the unsaturated polyhydric alcohols such as 2-butene-1,4-diol, alpha allyl glycerol ether, dipropylene glycol and pentene diol, also unsaturated hydroxy ethers such as allyl or vinyl glycerol ethers and allyl or vinyl pentaerythritol ethers, etc.; and, still other chemical compounds comprising an ethylenic or an acetylenic linkage which are not rendered unreactive in the polyester chain by their chemical combination into the polyester chain by way of other functional groups, whereby the mixed esters of adducts of hexahalocyclopentadiene are produced.

Another method of providing for copolymerizable unsaturation in the polyester chain which may be employed involves effecting the diene synthesis of a hexahalocyclopentadiene with a polybasic alcohol or ester, or equivalents thereof which contains at least two olefinic linkages, one of which is reactive in the diene synthesis, while the others which are unreacted are capable of being copolymerizable in the cross-linking reaction. Among the materials which are useful for this purpose are acetylenic compounds and diolefinic and polyolefinic compounds.

Alternatively or in addition to including the flame retardant component in the unsaturated polyester, we have found that the chlorine content of the final polyester formulations may be obtained, or, substantially increased, by employing a cross-linking agent which also contains the component which imparts flame retardance to the final compositions of this invention. Among such cross-linking agents which may be useful for this purpose are the following: Diallyl-1,4,5,6,7,7-hexachlorobicyclo-(2.2.1)-5-heptene-2,3-dicarboxylate; diallyl-1,4,5,6,7,7-hexachloro-2-methylbicyclo-(2.2.1)-5-heptene-2,3-dicarboxylate; diallyl - 1,2,4,5,6,7,7 - heptachlorobicyclo - (2.2.1) - 5 - heptene-2,3-dicarboxylate; and triallyl-1,4,5,6,7,7-hexachlorobicyclo - (2.2.1)-5 - heptene - 2 - acetic - 2,3 - dicarboxylate. These compounds can be prepared by reacting hexachlorocyclopentadiene with the indicated dicarboxylic acid and esterifying the resultant product with an unsaturated alcohol such as allyl alcohol. Other cross-linking agents may advantageously be employed; for example, reaction products of hexachlorocyclopentadiene with isoprene or butadiene retaining a reactive unsaturated linkage can be used as cross-linking agents directly without further reaction. Still other methods for the preparation of the unsaturated cross-linking agents, employing type reactions known to the art, will be apparent from the foregoing. In addition, materials such as triallyl cyanurate may be employed for improving heat resistance; divinyl benzene, monochlorostyrene, dichlorostyrene, diallyl phthalate, diallyl maleate and similar mono- or polyvinyl or mono- or polyallyl derivatives are also useful.

It is apparent from a consideration of the foregoing examples and the foregoing discussion that the particular chemical ingredients selected and their relative proportions may be varied over a wide range to produce a wide variety of compositions embraced within this invention. It should be emphasized that modifications can be made to accentuate any given property or combination of properties desired. For example, hardness in the final polyester resin can be varied by using short chain polyhydric alcohols and acids or long chain polyhydric alcohols and acids; the viscosity of the mixture comprising the unsaturated polyester and the olefinic cross-linking agent may be varied by changing the ratio of unsaturated polyester to olefinic cross-linking agent; and the curing characteristics of such mixtures can be varied by changing the kind and proportion of polymerization catalyst employed. These above-listed characteristics may also be somewhat controlled by varying the nature and amount of the polycarboxylic compound unit added to the esterification reaction. In order to accentuate both flame retardance and heat resistance, we prefer that the hexahalocyclopentadiene content should not be less than that sufficient to supply a final product of not less than ten percent of halogen by weight of the polyester resin composition; the upper limit for the hexahalocyclopentadiene content is generally dictated by practical limits determined by the minimum necessary concentration of glycols and polycarboxylic compounds not being adducts of hexahalocyclopentadiene and olefinic compounds to give resinous compounds capable of being hardened and this upper limit is about 60 percent. Flame retardance may be accentuated by adding to the unsaturated polyester containing the hexahalocyclopentadiene component, a cross-linking agent which also contains flame retardant properties obtained from a hexahalocyclopentadiene in chemical combination therewith. Mechanical strength can be accentuated, for example, by employing diallyl diglycol carbonate as the cross-linking agent with a linear unsaturated polyester resin of this invention, and forming glass cloth laminates.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in cross-linking agent and thereafter effecting the copolymerization in the presence of catalysts and heat to produce the foamed article. Formulations which are useful for making moldings embodying the compositions of this invention may be made by mixing into the unsaturated linear polyester and olefinic cross-linking agent mixture a fibrous reinforcing medium and/or an inert filler such as chopped fiber glass rovings, macerated fabric, asbestos fibers and mica, which serve as fibrous reinforcing media and incorporating a small percentage of a mold lubricant, catalyst and/or promoter.

An infinite variety of products may also be prepared, which embody the copolymers of this invention, by copolymerizing the linear unsaturated polyester materials produced in accordance with this invention, as in Example 1, with a mono-olefinic cross-linking agent in the presence of another copolymerizable linear polyester material having different structure than that produced by this invention. For example, by dissolving 23.1 parts of the product of Example 1 and 4.3 parts of an unchlorinated commercial polyester resin dissolved in styrene and especially designed for imparting flexibility and designated as Paraflex P-13 (made by Rohm and Haas Company, Philadelphia, Pennsylvania) and 2.3 parts by weight of styrene and effecting the copolymerization of the mixture by a catalyst, a material is produced which has better flexibility and different properties than any materials produced heretofore. It is to be understood that dyes, pigments, plasticizers, lubricants and various other modifying agents are contemplated as being incorporated in certain formulations to produce compositions embraced in this invention in order to obtain or accentuate any given property.

Having thus described our invention, what we claim and desire to secure by Letters Patent is:

We claim:

1. A polymerizable mixture comprising (A) a polymerizable linear polyester of ingredients comprising (1) an adduct of hexahalocyclopentadiene and a polyhydric alcohol containing aliphatic carbon to carbon unsaturation, wherein the halogen is selected from the group consisting of chlorine, bromine, fluorine, and mixtures thereof, (2) a polycarboxylic compound selected from the group consisting of polycarboxylic acids and acid anhydrides and (3) a polyhydric alcohol containing aliphatic carbon to carbon unsaturation, and (B) a polymerizable monomer containing a $CH_2=C=$ group.

2. A mixture of claim 1 wherein the adduct (1) is 3 - 1,4,5,6,7,7 - hexachlorobicyclo - (2.2.1) - 5 - heptene-2 - yl - methoxy - 1,2 - propane diol.

3. A mixture of claim 1 wherein the adduct (1) is 1,4,5,6,7,7 - hexachloro - 2,3 - bis - hydroxymethyl - bicyclo - (2.2.1) - 5 - heptene.

4. A mixture of claim 1 having a polymerization inhibitor added thereto.

5. A mixture of claim 1 when polymerized to an infusible, insoluble, resinous composition.

6. A mixture of claim 1 when mixed with an inert filler and polymerized to an infusible, insoluble, resinous composition.

7. A reinforced plastic article comprising a mixture of claim 1 when polymerized to an infusible, insoluble, resinous composition, and a fibrous reinforcing medium.

8. A laminated article comprising a plurality of sheets of glass fibrous material and as a binder therefor, an infusible, insoluble, resinous composition resulting from the polymerization of a mixture defined in claim 1.

9. A mixture of claim 2 wherein the polyhydric alcohol (3) is alpha allyl glycerol ether.

10. A mixture of claim 2 wherein the polyhydric alcohol (3) is 2-butene-1,4-diol.

11. A mixture of claim 3 wherein the polyhydric alcohol (3) is alpha allyl glycerol ether.

12. A mixture of claim 3 wherein the polyhydric alcohol (3) is 2-butene-1,4-diol.

13. A mixture of claim 12 wherein the polymerizable monomer (B) is selected from the group consisting of vinyl acetate, acrylonitrile, and mixtures thereof.

14. A composition of matter comprising a polymerizable linear polyester of ingredients comprising (1) an adduct of hexahalocyclopentadiene and a polyhydric alcohol containing aliphatic carbon to carbon unsaturation, wherein the halogen is selected from the group consisting of chlorine, bromine, fluorine and mixtures thereof, (2) a polycarboxylic compound selected from the group consisting of polycarboxylic acids and acid anhydrides and (3) a polyhydric alcohol containing aliphatic carbon to carbon unsaturation.

15. A composition of claim 14 wherein the adduct (1) is 3 - 1,4,5,6,7,7 - hexachlorobicyclo - (2.2.1) - 5 - heptene - 2 - yl - methoxy - 1,2 - propane diol.

16. A composition of claim 14 wherein the adduct (1) is 1,4,5,6,7,7 - hexachloro - 2,3 - bis - hydroxymethyl-bicyclo - (2.2.1) - 5 - heptene.

17. A composition of claim 15 wherein the polyhydric alcohol (3) is alpha allyl glycerol ether.

18. A composition of claim 15 wherein the polyhydric alcohol (3) is 2-butene-1,4-diol.

19. A composition of claim 16 wherein the polyhydric alcohol (3) is alpha allyl glycerol ether.

20. A composition of claim 16 wherein the polyhydric alcohol (3) is 2-butene-1,4-diol.

References Cited in the file of this patent

UNITED STATES PATENTS 2,606,910    Herzfeld et al. ---------- Aug. 12, 1952

UNITED STATES PATENT OFFICE

CERTIFICATE OF CORRECTION

Patent No. 2,863,795            December 9, 1958

Paul Robitschek et al.

It is hereby certified that error appears in the printed specification of the above numbered patent requiring correction and that the said Letters Patent should read as corrected below.

Column 3, line 57, for "htan" read -- than --; column 4, line 56, for "polyester is an" read -- polyester is at --; column 6, line 69, for "actyl" read -- octyl --.

Signed and sealed this 26th day of April 1960.

(SEAL)
Attest:
KARL H. AXLINE
Attesting Officer

ROBERT C. WATSON
Commissioner of Patent